Jan. 7, 1964 V. W. BALL 3,116,670
AUTOMATIC EXPOSURE CONTROL FOR CAMERAS
Filed Feb. 27, 1963
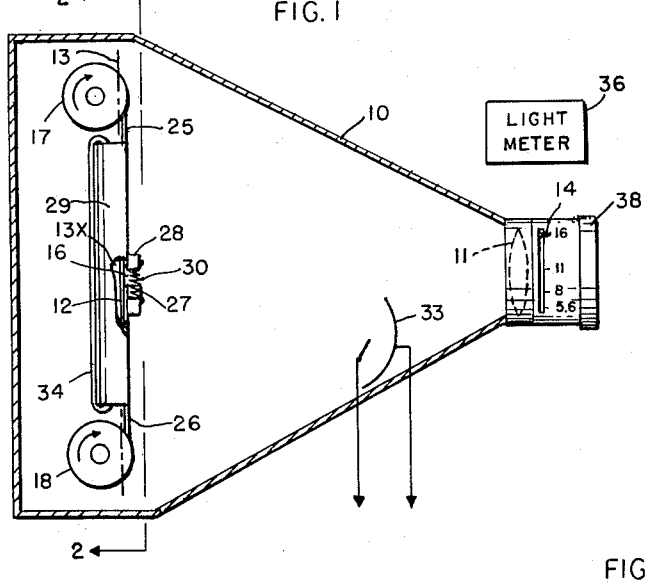
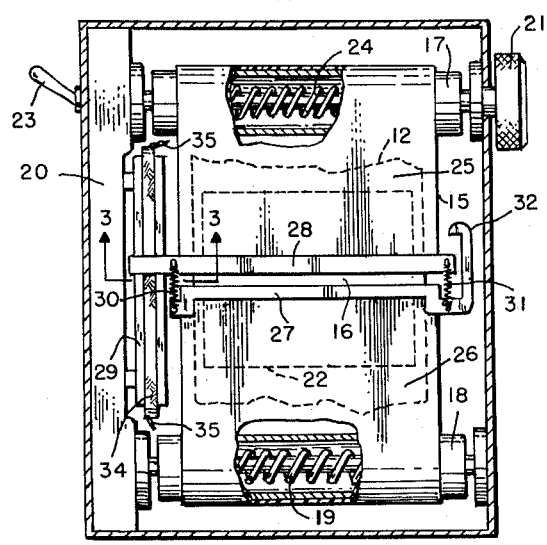
INVENTOR,
VINCENT W. BALL
BY *Harry M. Saragovitz*
ATTORNEY

3,116,670
AUTOMATIC EXPOSURE CONTROL FOR CAMERAS

Vincent W. Ball, Allenhurst, N.J., assignor to the United States of America as represented by the Secretary of the Army
Filed Feb. 27, 1963, Ser. No. 261,547
6 Claims. (Cl. 95—10)
(Granted under Title 35, U.S. Code (1952), sec. 266)

The invention described herein may be manufactured and used by or for the Government for governmental purposes, without the payment of any royalty thereon.

This invention relates to exposure controlling means for photographic apparatus and particularly to such apparatus wherein the quantity of light flux reaching different local areas of the sensitive material is under control during the travel of a focal plane shutter over the picture format.

To present a complete and accurate record every portion of the area of a photograph must contain optimum legibility. A conventional photograph when properly exposed and processed will usually contain sufficient legible detail to provide a reasonably good representation of the subject or at least a pictorially pleasing effect. When however, the picture must present all detail with good legibility a conventional photograph will not be sufficient. For example when picturing ground terrain from aircraft high resolution is required. However the picture must also possess an even more important characteristic and one most difficult to obtain namely legibility of every portion of the picture. Photographic emulsions without exposure control fail to provide the required detail especially in military application where minute detail must be clearly visible.

The present invention provides means to automatically modulate the exposure on the sensitive material throughout the traverse of a focal plane shutter. Such modulation being obtained by varying the width of the exposing slot in the shutter curtain in accordance with the brightness in the image at each instant of the shutter travel.

To accomplish the above desired result a sensitive photo-cell or other sensing means is located within the camera body where it will receive light passing through the camera lens and reflected from a high reflectance narrow strip at the leading edge of the curtain slot. The photo-cell will therefore receive the integrated light flux from the narrow strip representing the instantaneous intensity of light in the image corresponding to a narrow strip in the subject being pictured.

The output of the cell is amplified and applied to an elongated electromagnet fixed to the camera body along the edge of the curtain. The trailing edge of the curtain slot is provided with a ferrous strip which extends into the field of the magnet and is attracted to it when the magnet is energized. The intensity of the magnetic flux being determined by the input from the photocell. Thus the drag on the ferrous strip is correspondingly varied in accordance with the light intensity in the various portions of the subject. The width of the slot in the shutter curtain is flexible and responds to the drag of the magnet to vary the light reaching the film or other sensitive material.

The control of the slot width may be effected in any suitable manner. The example presented herein provides light spring tension between the two edges of the slot which are mobile and motivated by the torque used to drive the curtain. Therefore the driving torque and the variable drag determine the slot opening and since the driving torque is substantially constant and the drag varies with the illumination of the subject the mechanism for controlling the slot width may readily be designed to automatically provide correct exposure throughout the picture format. A more complete description of the structure and operation of the invention will be set forth hereinafter.

A primary object of the invention is to provide a photographic exposure controlling system which automatically controls the light flux reaching individual areas of the picture throughout the exposure period according to a predetermined requirement.

A further object of the invention is to provide a photographic exposure controlling system in which the exposure impressed upon the selected areas of the sensitive material is controlled by the light intensity of the corresponding local area in the subject.

A further object of the invention is to provide a photographic exposure controlling system including a focal plane shutter wherein the width of the exposing slot is automatically varied to provide the required exposure control.

A further object of the invention is to provide a photographic exposure controlling system wherein the exposure of each area of the picture format is automatically controlled to provide optimum subject contrast and thereby provide optimum legibility throughout the picture.

Other objects and features of the invention will more fully appear from the following description and will be particularly pointed out in the claims.

To provide a better understanding of the invention a particular embodiment thereof will be described and illustrated in the accompanying drawings wherein:

FIGURE 1 is a partially diagrammatic illustration of the invention.

FIGURE 2 is a cross section on line 2—2 FIGURE 1.

FIGURE 3 is a detail cross section on line 3—3 FIGURE 2.

FIGURE 4 is a perspective view of the actuating electromagnet.

FIGURE 5 is a circuit diagram of the electrical components of the system.

Referring to the drawings a conventional type focal plane camera is shown partially diagrammatically and in cross section. The camera elements are contained in a casing 10 and means, not shown, are provided for focusing the image produced by the lens 11 upon the film 12 held in the focal plane 13. The film is held in the focal plane by a supporting plate 13X. The lens is provided with an adjustable diaphragm having a control lever 14. The shutter 15 is of the focal plane type having a transverse slot 16 and is actuated by a pair of rolls 17 and 18 rotatively mounted in the camera body. The shutter is driven in the conventional manner or in any suitable manner such as by the helical spring 19 located in the roll 18. One end of the spring is secured to the roll and the other end is anchored to a tension adjusting means not shown within the casing 20. The shutter speed is adjusted by changing the tension in the spring 19 in roll 18. The shutter is wound by rotating a knob 21 secured to roll 17 until the slot 16 reaches a position beyond the top boundary of the picture format 22 where it is held by a shutter releasing catch not shown.

To expose the film the catch is released by actuating the shutter release lever 23 at which time the spring 19 causes the curtain slot to traverse the picture format. During exposure a light spring 24 in the roll 17 is wound up to create a slight tension in the curtain. This spring unwinds when the shutter spring 19 is wound.

The shutter curtain is made in two sections 25 and 26 which are slightly separated to form the slot 16. As described above when an exposure is made the curtain travels downward as seen in FIGURE 2. The leading edge of the slot is therefore at the section 26 of the curtain and the trailing edge is at the section 25. The leading edge of the slot has a narrow strip 27 thereon having a high reflectance and diffuse surface extending across the curtain. The trailing edge of the slot has secured thereto a strip of ferrous metal 28 one end of which extends beyond the edge of the curtain and functions as an armature in conjunction with an elongated electromagnet 29 which is fixed along the edge of the curtain with its pole faces in the plane of the path of travel of the extended end of the strip 28.

The strip 28 may be extended at both ends to function in connection with electromagnets fixed to the camera body at both sides of the shutter curtain.

The slot 16 is adjustable in width which is accomplished by connecting the two sections 25 and 26 of the curtain by a pair of relatively light tension springs 30 and 31 the ends of which are secured respectively to the outer ends of the strips 27 and 28. Thus the width of the slot is a function of the tension in the curtain. A stop member 32 is secured to one of the curtain sections and acts to limit over expansion of the springs when the shutter is wound.

A photo-cell 33 or other sensing device is secured inside the camera body in position to receive light coming in through the lens 11 and being reflected from the strip 27. The surface of the strip should have high reflectance and produce substantial scatter of reflected light. The light reaching the cell 33 represents very closely the intensity of illumination of that portion of the image reflected from the reflecting strip at a given instant.

The cell is connected in a circuit shown schematically in FIGURE 4 including a suitable source of power such as a battery. The cell output is fed to an oscillator and thence to an amplifier the power output of which is inversely proportional to the cell output. Hence when the illumination of the subject is high the output of the amplifier is low and vice versa.

The output of the amplifier is fed to the coil 34 on the electromagnet 29 through the connections 35. The flux density in the magnet is therefore inversely proportional to the illumination in the selected portion of the image formed by the lens 11 and is reflected by the strip 27. During the traverse of the shutter the strip 28 is attracted to the magnet which imposes a frictional drag upon the curtain section 25 which in turn causes the torque in the driving spring 19 to stretch the springs 30 and 31 to a degree dependent upon the density of flux in the magnet. The width of the slot is therefore automatically controlled by the light intensity in successive local areas of the image scanned by the shutter slot.

If desired the camera may be provided with another sensing device 36 directed toward the subject and operative to measure the integrated light intensity of the whole subject. This device may be a conventional light meter and provide an indication from which the lens diaphragm 14 may be adjusted to provide the proper exposure for the overall light intensity in the subject and for the film speed.

To provide a more comprehensive understanding of the invention a more complete description of its operation will now be set forth.

It is apparent that to achieve optimum results the required corrective scope thereof should be established. This is dependent on various factors such as the type of film used, the design of the apparatus such as the characteristics of the springs used to power the device and the character of the surfaces between the strip 28 and the magnet 29. Moreover the design of electrical components may also serve to fulfill a particular group of requirements. As an example it is proposed that corrective factors be assumed embracing a brightness range of two lens stops.

The best initial setting of the shutter speed and slot width should also be determined. From practical considerations it is desirable to operate the shutter with a narrow slot opening. By so doing the automatic correction afforded by the invention responds more faithfully to the fine details in all areas of the image. A medium stop setting, a narrow slot and a medium fast shutter travel such as that which will yield a normal exposure for the film used should be adopted. The slot may be one eighth inch wide for a four inch by five inch picture size.

Before making an exposure the actual integrated subject brightness should be measured with the meter 36. From this reading the stop lever 14 is set to provide optimum exposure for a given subject to produce a picture with conventional contrast range without contrast control. If desired this exposure adjustment may be obtained by automatic means activated by the meter 36 or an equivalent device.

Before winding the shutter 15 a capping shutter 38 on the lens 11, or other suitable means is closed to prevent fogging the film. The shutter is then wound by rotating the knob 21 and the capping shutter is opened. The photocell 33 and amplifier 37 are now activated and the shutter is released by actuating the lever 23. The cell 33 through its amplifier 37 now take over automatic adjustment of the width of the slot 16 during the exposure period to provide correction for the overly dark shadow areas and incorrect density values in the high lights.

During the exposure, light flux coming from a narrow portion of the image is reflected by the strip 27 to the cell 33 which determines the intensity of magnetic flux in the magnet 29 and consequently the resulting drag on the curtain section 25. As the magnetic flux changes, during the travel of the shutter, due to changes in subject brightness the slot opens and closes.

If a conventional exposure is made without automatic compensation the slot will assume the width determined by the structural parameters of the system and the lens stop opening adjusted in accordance with the reading of the meter 36.

When however the cell 33 and the amplifier 37 are activated and an exposure is made the drag on the strip 28 and consequently the drag on curtain section 25 is automatically regulated in accordance with the light intensity of successive small areas of the subject as the image is scanned by the slot 16. The springs 30 and 31 are therefore elongated or contracted to vary the slot width due to the torque applied to curtain section 26 by the driving spring 19.

For example if the slot 16 is scanning a portion of the image having a low degree of illumination the output of the cell 33 is small. This low input to the inverter and amplifier produces an increased amplifier output which is fed to the magnet coil 34. The resulting increased magnetic flux imposes a drag on shutter section 25 which increases the slot width an amount inversely proportional to the subject brightness for the instant the slot passes the portion of the subject being scanned. When the subject brightness is relatively great the inverse current component issuing from the amplifier decreases the magnetic flux in magnet 29 which allows the springs to narrow the slot width the required degree.

Thus each small area of the picture has its exposure locally rectified an amount necessary to produce high legibility and quality in every portion of the picture.

When the apparatus of the invention is designed and adjusted for optimum performance it will correct distorted contrast areas in the picture but will not alter perceptibly the contrast range in those areas which are so lighted in the subject as to produce good legibility without correction. This selective correction produces results unattainable by any prior known technique. For example equivalent results are not attainable by chemical reduction methods. Chemical treatment is not selective and therefore cannot achieve local correction in the picture.

The invention may be used to correct the contrast in a negative which has not been contrast corrected. In such case the negative would be evenly illuminated to produce an image at the focal plane of an exposing device such as that above described. The resulting exposure would produce a corrected version of the original negative upon another film placed at the focal plane of the exposing device.

What is claimed is:

1. Automatic photographic exposure controlling apparatus comprising a casing, a focal plane to receive a photosensitive sheet, a lens to focus an image thereon, a focal plane shutter having an exposing slot extending transversely thereof, a shutter driving motor, slot width adjusting means consisting of parallel slot defining members, resilient means tending to reduce the slot width, electromagnetic means acting to apply a braking force upon one of said slot defining members to cause said shutter motor and said resilient means to regulate the slot width, a narrow highly reflective diffuse reflecting area on said shutter adjacent said slot extending across the picture format, a light sensing means in said casing to receive only light reflected from said strip and electrical inverse power amplifying means connected to the output of said sensing means whereby varying light intensity reaching the sensing means from successive narrow areas of the subject will vary slot width in inverse proportion to the incident light values.

2. An automatic photographic exposure control system comprising a light tight casing a focal plane in said casing for receiving a sensitive sheet, a lens to focus an image on said plane, a focal plane shutter having a two section curtain the adjacent ends of the sections being spaced apart to form a narrow slot, sensitive tension springs connecting said shutter sections, a driving motor for said shutter, electromagnetic means for braking the travel of the trailing curtain section, a narrow reflecting strip adjacent said slot acting to reflect light passing through the lens from a portion of the image substantially the same as that passing through the slot to expose the sensitive material, and a light sensing means to measure the instantaneous light intensity reflected from the strip throughout the shutter travel the output of said sensing means being fed to said electromagnetic means to control the magnetic flux therein and thereby control the braking action applied to the trailing section of the shutter whereby the torque of the shutter driving motor and said tension springs will regulate the slot width to locally rectify exposure applied to successive narrow-portions of the image throughout the shutter travel.

3. An automatic photographic exposure control system comprising a light tight casing, a focal plane in said casing for receiving a photo-sensitive sheet, a lens for focusing an image upon said plane, a focal plane shutter having two sections the adjacent edges of which define a transverse exposing slot in said shutter, a shutter driving motor, sensitive spring means connecting said shutter sections, a narrow light reflecting strip on the edge of the leading shutter section at said slot, an electromagnet and armature combination having relative sliding engagement one element thereof being secured to the trailing curtain section and the other to said casing, a light sensing means in said casing in position to receive only light reflected from said strip, an amplifier connected to said light sensor operative to provide an output inversely proportional to the output of said sensor and having its output connected to said eletromagnet whereby the intensity of light entering said lens and reflected from said strip inversely controls the magnetic flux intensity in said magnet as the shutter scans the picture format imposing controlled drag upon the trailing shutter section thereby causing said driving motor to automatically adjust the slot width to locally correct exposure of individual areas of the picture.

4. An automatic photographic exposure control system comprising a lens for focusing the image of a subject upon an image plane, a two section focal plane shutter having an exposing slot between its sections acting to expose photosensitive material and the image plane to said image, driving means for said shutter, a housing to enclose the exposing components, sensitive spring means connecting the two shutter sections rendering the width of the slot subject to the tension between said sections, a narrow reflecting strip at the leading edge of said slot, a light sensing means positioned in said casing to receive only light reflected from said strip, braking means including an electromagnet connected to the output of said sensing means through an inverse power amplifier operable to retard the trailing section of said shutter with a force inversely proportional to the instantaneous light intensity reaching the light sensing means whereby the shutter driving means will enlarge and reduce the slot width during the shutter travel thereby selectively controlling the degree of exposure of successive localized narrow portions of the picture.

5. A photographic exposure control system according to claim 4 and stop means to establish a maximum slot width.

6. Photographic exposure controlling apparatus according to claim 1 and a capping shutter for excluding light from reaching the film when the exposing shutter is rewound.

References Cited in the file of this patent

UNITED STATES PATENTS

| | | |
|---|---|---|
| 2,179,717 | Fedotoff | Nov. 14, 1939 |
| 2,996,952 | Orlando | Aug. 22, 1961 |
| 3,063,354 | Matulik | Nov. 13, 1962 |